US012596097B2

(12) United States Patent
Huang et al.

(10) Patent No.: US 12,596,097 B2
(45) Date of Patent: Apr. 7, 2026

(54) OPTICAL ELEMENT DETACHABLE CAPILLARY CLIP AND CAPILLARY ELECTROPHORESIS APPARATUS

(71) Applicant: NANJING GENSCRIPT BIOTECH CO., LTD., Nanjing (CN)

(72) Inventors: Dongliang Huang, Nanjing (CN); Wei Zhang, Nanjing (CN)

(73) Assignee: NANJING GENSCRIPT BIOTECH CO., LTD., Nanjing (CN)

( * ) Notice: Subject to any disclaimer, the term of this patent is extended or adjusted under 35 U.S.C. 154(b) by 216 days.

(21) Appl. No.: 18/518,933

(22) Filed: Nov. 24, 2023

(65) Prior Publication Data

US 2024/0085371 A1     Mar. 14, 2024

Related U.S. Application Data

(63) Continuation of application No. PCT/CN2022/097505, filed on Jun. 8, 2022.

(30) Foreign Application Priority Data

Jun. 8, 2021     (CN) .......................... 202110639616.3

(51) Int. Cl.
*G01N 27/447* (2006.01)

(52) U.S. Cl.
CPC .............................. *G01N 27/44721* (2013.01)

(58) Field of Classification Search
None
See application file for complete search history.

(56) References Cited

U.S. PATENT DOCUMENTS 5,318,686 A * 6/1994 Dill ................. G01N 27/44708
204/603

FOREIGN PATENT DOCUMENTS

| CN | 101165472 A | 4/2008 |
|----|-------------|--------|
| CN | 204958934 U | 1/2016 |
| CN | 108169192 | 6/2018 |
| CN | 208701067 U | 4/2019 |
| CN | 210269617 | 4/2020 |
| JP | 2010243408 | 10/2010 |

OTHER PUBLICATIONS

International Search Report in PCT/CN2022/097505 mailed on Sep. 8, 2022, 8 pages.
Written Opinion in PCT/CN2022/097505 mailed on Sep. 8, 2022, 8 pages.

* cited by examiner

*Primary Examiner* — J. Christopher Ball
(74) *Attorney, Agent, or Firm* — METIS IP LLC

(57) ABSTRACT

An optical element detachable capillary clip and a capillary electrophoresis apparatus. The capillary clip comprises at least one capillary channel and a clip body defining the at least one capillary channel, and a capillary (700) can be mounted in the capillary channel. The clip body is provided with a detection window (201) and at least one optical detection element, the at least one optical detection element being directly or indirectly connected in the detection window (201). The at least one optical detection element can be removed from the clip body, such that the detection window (201) exposes at least part of an unobstructed region.

20 Claims, 7 Drawing Sheets

OPTICAL ELEMENT DETACHABLE CAPILLARY CLIP AND CAPILLARY ELECTROPHORESIS APPARATUS

CROSS-REFERENCE TO RELATED APPLICATIONS

The present application is a Continuation of International Application No. PCT/CN2022/097505, filed on Jun. 8, 2022, which claims priority to the Chinese Application No. 202110639616.3, field on Jun. 8, 2021, which is incorporated herein by reference in its entirety.

TECHNICAL FIELD

This description relates to the technical field of biochemical analysis, and in particular, to an optical element detachable capillary clip and a capillary electrophoresis apparatus.

BACKGROUND ART

Capillary electrophoresis (CE), also referred to as high performance capillary electrophoresis (HPCE), is new liquid phase separation technology with an elastic quartz capillary as a separation channel and a high voltage direct-current electric field as a driving force. Under the action of the electric field, analytes in the capillary migrate by means of an electrolyte solution, and are allocated based on ion mobility and/or by noncovalent interactions as alternating phases for separation. There are several CE separation methods, including: capillary zone electrophoresis (CZE), capillary gel electrophoresis (CGE), capillary isoelectric focusing (CLEF), capillary isotachophoresis (CITP), and micellar electrokinetic chromatography (MEKC). A capillary clip is a component of a separation system of a capillary electrophoresis apparatus.

SUMMARY

An embodiment of this description provides a capillary clip, comprising: at least one capillary channel, a capillary being mounted in the capillary channel; a clip body defining the at least one capillary channel; a detection window provided on the clip body; and at least one optical detection element directly or indirectly connected in the detection window, wherein the at least one optical detection element is removable from the clip body, such that the detection window exposes at least part of an unobstructed region.

In some embodiments, an auxiliary mounting element is removably mounted in the detection window, the at least one optical detection element is detachably connected to the auxiliary mounting element, and the auxiliary mounting element is provided with a chamber for avoiding the capillary and guiding the at least one optical detection element to be positioned and be aligned with the capillary.

In some embodiments, the auxiliary mounting element has a plurality of chambers isolated from each other.

In some embodiments, the chamber is configured to allow the at least one optical detection element to form an optical detection path perpendicular to the capillary.

In some embodiments, the auxiliary mounting element is provided with a positioning portion for assisting in capillary positioning.

In some embodiments, a positioning seal for channel sealing and capillary positioning is detachably connected at each of a sample inlet end and a sample outlet end of the detection window, and the capillary is capable of penetrating the positioning seal.

In some embodiments, the detection window is rectangular, a ratio of the length to the width of the detection window is greater than 2, and the capillary passes through the detection window in a width direction of the detection window.

In some embodiments, the clip body comprises an inlet segment clip portion, a detection portion and an outlet combination portion that are connected in sequence.

In some embodiments, the capillary clip further comprises a refrigerant channel defined by the clip body, the refrigerant channel and each of the capillary channels being combined at the inlet segment clip portion and the outlet combination portion, and the refrigerant channel and each of the capillary channels being separated at the detection window.

In some embodiments, the inlet segment clip portion comprises at least one single-channel clip comprising a single-body clip and a connecting tube, wherein two ends of the connecting tube are connected to the single-body clip, and the connecting tube forms a part of the at least one capillary channel.

In some embodiments, the two ends of the connecting tube are detachably connected to the single-body clip such that a connecting tube with a different length is replaceable for the single-channel clip.

In some embodiments, the inlet segment clip portion further comprises a detachable segment clip housing, the segment clip housing is mounted on a periphery of the at least one single-channel clip, and at least part of a tube body of the connecting tube is exposed from the segment clip housing.

In some embodiments, the detection portion comprises an inlet window body and an outlet window body, the inlet window body and the outlet window body being detachably connected to each other, and the inlet window body and the outlet window body being assembled and combined to form the detection window.

In some embodiments, the clip body comprises at least two capillary channels, the outlet combination portion comprises a combining sealing body, and the at least two capillary channels converge in the combining sealing body to form a combined channel.

In some embodiments, the combined channel is provided with a bent portion, and the bent portion is capable of allowing the capillaries in the combined channel to adjust their exposed end lengths.

An embodiment of this description provides a capillary electrophoresis apparatus, comprising a capillary clip as described above.

BRIEF DESCRIPTION OF THE DRAWINGS

This description will be further illustrated by way of exemplary embodiments, and these exemplary embodiments will be described in detail with reference to accompanying drawings. These embodiments are not restrictive, and in these embodiments, the same numerals represent the same structures, in which.

LIST OF REFERENCE SIGNS

Figure 1:
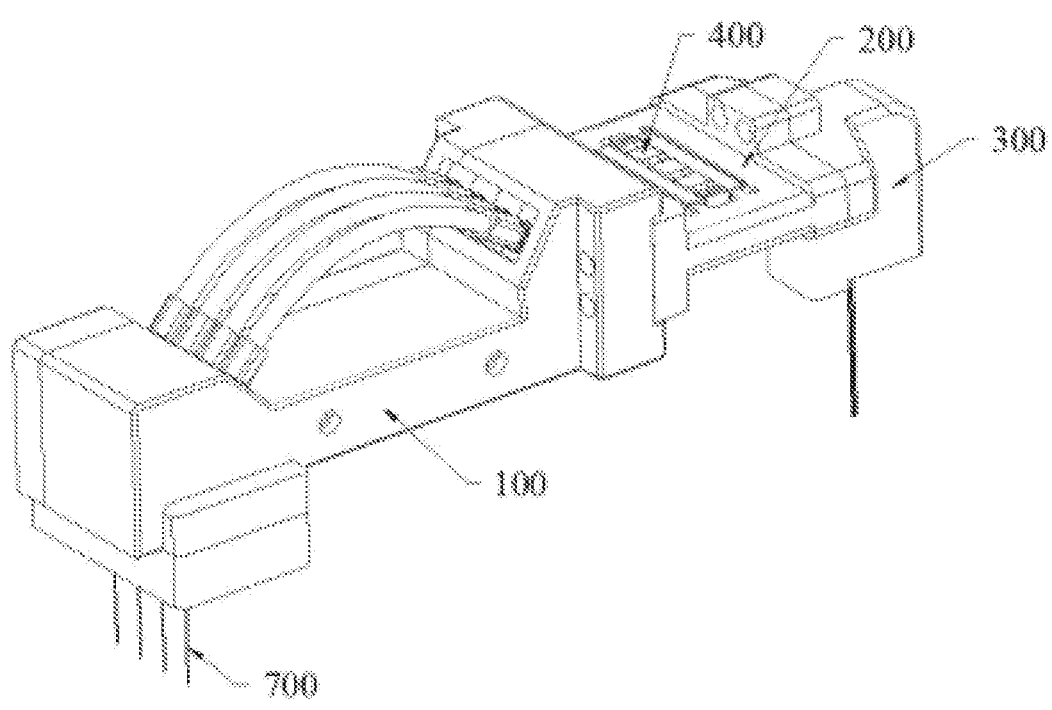
FIG. 1 is a perspective schematic structural diagram of a capillary clip according to some embodiments of this description.

100—Inlet segment clip portion; 200—Detection portion; 300—Outlet combination portion; 400—Auxiliary mounting element; 500—Inlet end sealing assembly; 600—Outlet end sealing assembly; 700—Capillary; 110—Single-channel clip; 111—Single-body clip; 112—Connecting tube; 113—Threaded joint assembly; 114—Clip inlet channel; 115—Connecting channel; 116—Clip outlet channel; 117—Refrigerant inlet channel; 120—Segment clip housing; 121—Inlet end sealing plate; 122—Opening; 130—Capillary channel inlet; 140—Main refrigerant inlet; 150—Third seal ring; 201—Detection window; 201*a*—Sample inlet end; 201*b*—Sample outlet end; 202—Inlet window body; 203—Outlet window body; 204—First positioning seal; 205—Second positioning seal; 206—Detection inlet channel; 207—Detection outlet channel; 208—Channel branch; 209—Inlet end sealing component; 210—Outlet end sealing component; 211—Fourth seal ring; 301—Combined channel; 302—Bent portion; 303—Refrigerant outlet channel; 304—Capillary channel outlet; 305—Main refrigerant outlet; 401—Chamber; 400*a*—Insertion end; 400*b*—Non-insertion end; 401*a*—First end; 401*b*—Second end; 402—Avoidance groove; 403—Claw; 501—Inlet end rubber sealing head; 502—Inverted inlet end sealing cone; 503—First seal ring; 601—Outlet end rubber sealing head; 602—Inverted outlet end sealing cone; 603—Outlet end sealing nut.

DETAILED DESCRIPTION OF EMBODIMENTS

For clearer description of the technical solutions in the embodiments of this description, the accompanying drawings required for describing the embodiments will be briefly described below. Apparently, the accompanying drawings in the following description show merely some examples or embodiments of this description, and those of ordinary skill in the art may still apply this description to other similar scenarios according to these accompanying drawings without any creative effort. Unless obvious from the linguistic context or otherwise stated, the same reference signs in the drawings represent the same structure or operation.

As shown in this description and the claims, the words "a", "an" and/or "the" do not specifically refer to the singular, but may also include the plural, unless the context clearly indicates otherwise. Generally, the terms "including" and "comprising" only imply the inclusion of explicitly identified steps and elements, and these steps or elements do not constitute an exclusive list. A method or device may also include other steps or elements.

Flowcharts are used in this description to explain operations performed by a system according to embodiments of this description. It should be understood that the preceding or following operations are not necessarily performed accurately in an order. Instead, the steps may be processed in a reverse order or simultaneously. In addition, other operations may also be added to these processes, or one or more steps may be removed from these processes.

A capillary electrophoresis apparatus may comprise a sample introduction system, a separation system, a detection system, and a data processing system. A capillary clip is a component of the separation system, and may be configured to load a capillary for sample separation. Some or all optical detection elements of the detection system are integrated to the capillary clip, such that the optical detection elements are accurately aligned with the capillary. When an electrolyte is carried in the capillary for sample separation, as electroosmotic flow is generated due to the presence of silicon hydroxyl groups on a tube wall, the electroosmotic flow will force a solution in the entire capillary to move directionally. In addition, since the electrolyte is subjected to self-heating under a high-voltage electric field and high temperature resulting from the electrolyte will lead to sample degradation, it is necessary to cool the separation system. There are two methods for cooling a capillary electrophoresis apparatus: gas-phase cooling and liquid-phase cooling. The gas-phase cooling is a main method for cooling a capillary electrophoresis apparatus, and features less restrictions on structural design and low use and maintenance costs. The gas-phase cooling of the capillary electrophoresis apparatus also has obvious defects, that is, the gas-phase cooling has the problems of poor temperature control stability and low efficiency, which may lead to decreased accuracy of detection results. The liquid-phase cooling has obvious advantages over the gas-phase cooling in temperature control stability and temperature control efficiency. However, the liquid-phase cooling has many restrictions on the structure of the separation system, especially the structure of the capillary clip. This, on one hand, makes it difficult for the liquid-phase cooling of the capillary electrophoresis apparatus to meet practical needs for multi-channel separation and detection, and on the other hand, makes the installation and maintenance of the apparatus technically difficult and costly. All the above factors limit the application of a liquid-cooled capillary electrophoresis apparatus.

An embodiment of this description proposes a capillary clip. An optical detection element is removably integrated with the capillary clip. The maintenance difficulty and maintenance costs of the capillary clip and the capillary electrophoresis apparatus are reduced while accuracy of an optical path and detection sensitivity are ensured. The capillary clip can meet requirements for liquid-phase cooling and multi-channel detection.

FIG. 1 is a perspective schematic structural diagram of a capillary clip according to some embodiments of this description. As shown in FIG. 1, the capillary clip comprises a clip body. The clip body is a main structure for loading a capillary 700 to assist in optical detection. In some embodiments, a clip body may comprise an inlet segment clip portion 100, a detection portion 200, and an outlet combination portion 300. Specifically, the inlet segment clip portion 100, the detection portion 200 and the outlet combination portion 300 are sequentially arranged on the clip body in a direction from an inlet end to an outlet end for a sample circulating in the capillary 700.

Various parts of the clip body may be connected in various ways. In some embodiments, the inlet segment clip portion 100, the detection portion 200 and the outlet combination portion 300 are non-detachably connected in sequence. For example, the clip body may be integrally formed. Integral forming means that at least one component of the inlet segment clip portion 100, at least one component of the detection portion 200 and at least one component of the outlet combination portion 300 are connected by means of integral forming to form a main structure of the clip body. The inlet segment clip portion 100, the detection portion 200 and the outlet combination portion 300 each may be composed of a single component independently or be formed by connecting a plurality of detachable components.

For another example, the inlet segment clip portion 100, the detection portion 200 and the outlet combination portion 300 are sequentially connected by means of welding and/or bonding, and welding and/or bonding connection can reduce the manufacturing difficulty and cost of the capillary clip.

In some embodiments, preferably, the inlet segment clip portion 100, the detection portion 200 and the outlet combination portion 300 are detachably connected in sequence. Specifically, the detachable and assemblable clip body can reduce the difficulty of mounting and removal the capillary and reduce the difficulty of manufacturing the clip body. For example, the inlet segment clip portion 100, the detection portion 200 and the outlet combination portion 300 are sequentially connected by means of bolting.

The number of capillaries loaded in the clip body can be set according to configuration requirements for the capillary electrophoresis apparatus. In some embodiments, the clip body may be loaded with a single capillary. Specifically, the clip body that can carry a single capillary is suitable for constructing a single-channel capillary clip, and the single-channel capillary clip may have a single capillary channel and a refrigerant channel matching the single capillary channel. In some embodiments, the clip body may be loaded with at least two capillaries. Specifically, the clip body that can carry at least two capillaries is suitable for constructing a multi-channel capillary clip, and the multi-channel capillary clip may have a plurality of capillary channels and refrigerant channels matching the plurality of capillary channels.

The detection portion 200 may be configured to form an optical detection path that penetrates a detected section of the capillary by cooperating with an optical detection element in an intermediate-late course or a late course of a capillary separation path. The detected section refers to a capillary body section of the capillary without a protective layer, and is formed by treating the protective layer of the capillary by sintering, corrosion by an acid solution, or physical stripping, etc.

Figure 2:
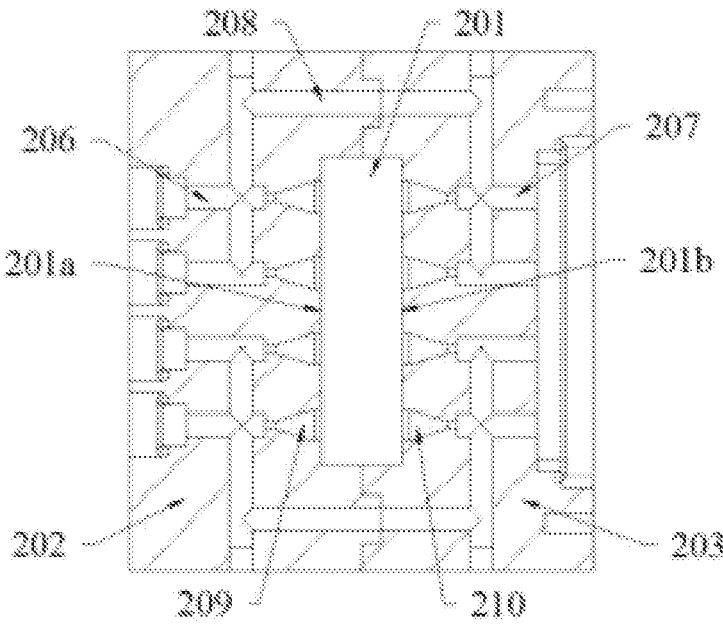
FIG. 2 is a schematic section view of a detection portion according to some embodiments of this description.

FIG. 2 is a schematic section view of the detection portion 200 according to some embodiments of this description. As shown in FIG. 2, the detection portion 200 may comprise a window body and a detection window 201 provided in the window body. Specifically, the detection window 201 can allow the capillary loaded in the clip body to pass through, such that the detected section of the capillary is exposed from the clip body through the detection window 201.

In some embodiments, the window body comprises an inlet window body 202 and an outlet window body 203. Further, the detection window 201 may be provided in the inlet window body 202 or the outlet window body 203, or the detection window 201 may be provided between the inlet window body 202 and the outlet window body 203. In some embodiments, preferably, the detection window 201 is provided between the inlet window body 202 and the outlet window body 203.

There may be a plurality of allowable methods for connecting the inlet window body 202 to the outlet window body 203. In some embodiments, the inlet window body 202 is non-detachably connected to the outlet window body 203. For example, the inlet window body 202 may be connected to the outlet window body 203 by bonding or hot-melt connection. In some embodiments, the inlet window body 202 is detachably connected to the outlet window body 203. For example, the inlet window body 202 may be connected to the outlet window body 203 by means of threaded connection. Specifically, the detachable detection window 201 can allow other attached functional components to be arranged in the detection window 201 with a relatively small spacing or width, and facilitate installation and maintenance.

Figure 3:
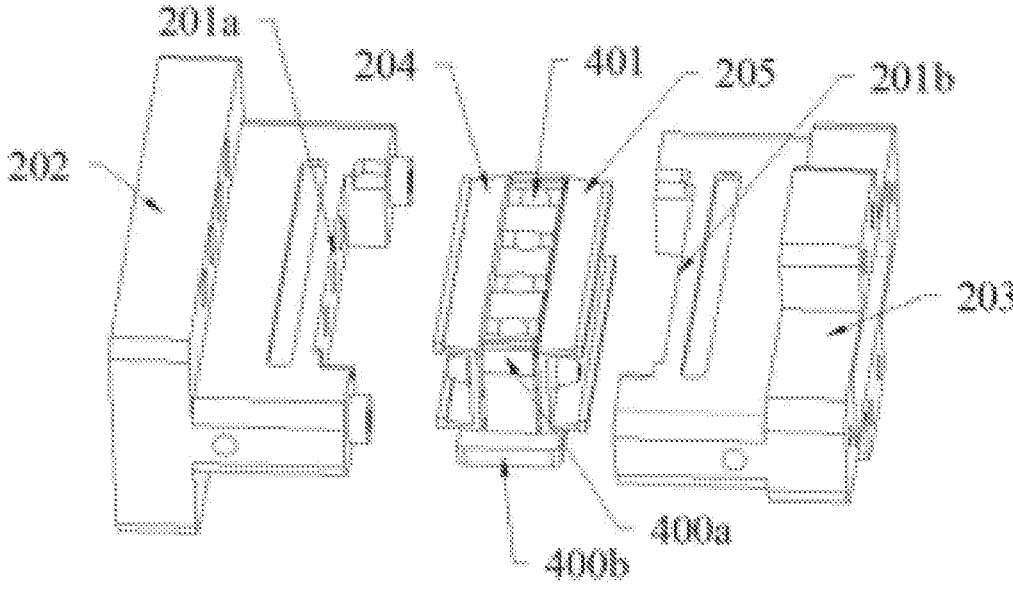
FIG. 3 is a schematic diagram of a detection portion in a disassembled state according to some embodiments of this description.

FIG. 3 is a schematic diagram of the detection portion 200 in a disassembled state according to some embodiments of this description. As shown in FIG. 3, the detection window 201 may have a sample inlet end 201*a* and a sample outlet end 201*b*. The capillary loaded in the clip body may pass through the detection window 201 to expose the detected section of the capillary from the clip body for optical detection, wherein a separated sample in the capillary passes through the detection window 201 in a direction from the sample inlet end 201*a* to the sample outlet end 201*b*. The detection window 201 may allow incident light to be guided to the detected section of the capillary from one side of the detection window 201, and allow emergent light passing through the detected section of the capillary to be collected from the other side opposite to the detection window 201.

In some embodiments, a positioning seal is provided for each of the sample inlet end 201*a* and the sample outlet end 201*b* of the detection window 201, and the capillary can penetrate the positioning seal. Specifically, a first positioning seal 204 is provided for the sample inlet end 201*a* of the detection window 201, and a second positioning seal 205 is provided for the sample outlet end 201*b* of the detection window 201. The first positioning seal 204 and the second positioning seal 205 each can seal a through hole for the capillary to pass through the detection window 201, and guide the detected section of the capillary in the detection window 201 to be arranged in a predetermined direction to ensure accurate positioning of the detected section of the capillary.

In some embodiments, the positioning seals are respectively removably mounted at the sample inlet end 201*a* and the sample outlet end 201*b* of the detection window 201. For example, as shown in FIG. 3, the first positioning seal 204 and the second positioning seal 205 each may be of a generally U-shaped structure. The first positioning seal 204 is snap-fitted on the inlet window body 202 in such an orientation that an opening of the U-shaped structure faces the sample inlet end 201*a*, and the second positioning seal 205 is snap-fitted on the outlet window body 203 in such an orientation that the opening of the U-shaped structure faces the sample outlet end 201*b*. For another example, the first positioning seal 204 and the second positioning seal 205 each may be of a generally plate-like structure, and threaded connection structures are arranged between the inlet window body 202 and the first positioning seal 204 and between the outlet window body 203 and the second positioning seal 205 for fixation. The removable positioning seals facilitate installation, debugging and maintenance.

In order to reduce the difficulty and cost of maintenance, especially the difficulty and cost of capillary cleaning and maintenance, the optical detection element can be removably integrated in the detection window 201.

Figure 4:
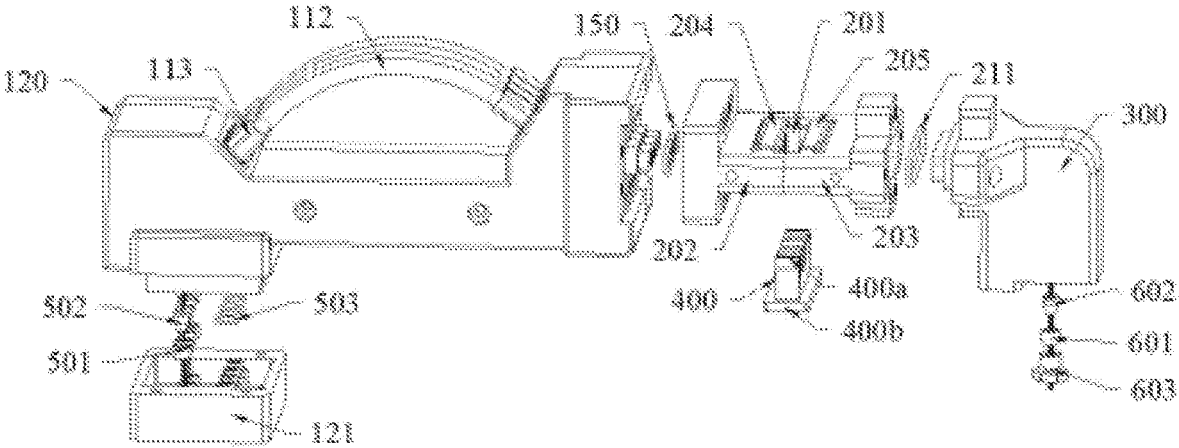
FIG. 4 is a schematic diagram of a capillary clip according to some embodiments of this description in a disassembled state.

FIG. 4 is a schematic diagram of the capillary clip according to some embodiments of this description in a disassembled state. In some embodiments, an auxiliary mounting element 400 is removably mounted in the detection window 201. The auxiliary mounting element 400 may be configured to position and mount the optical detection element, and the auxiliary mounting element 400 may be removed from the clip body such that the detection window 201 exposes at least part of an unobstructed region. Specifically, at least one optical detection element is removably connected in the detection window 201 by means of the auxiliary mounting element 400, and the optical detection element may be precisely aligned with the detected section of the capillary in the detection window 201 with the aid of the auxiliary mounting element 400. In the case of ensuring accuracy and detection sensitivity of the optical detection path after repeated removal and mounting, the detection window 201 may release an unobstructed region suitable for operation by removing the auxiliary mounting element 400, and the capillary may be cleaned by virtue of a simple cleaning tool (such as a cotton swab) to remove impurities attracted on an outer wall of the detected section of the capillary.

Figure 5:
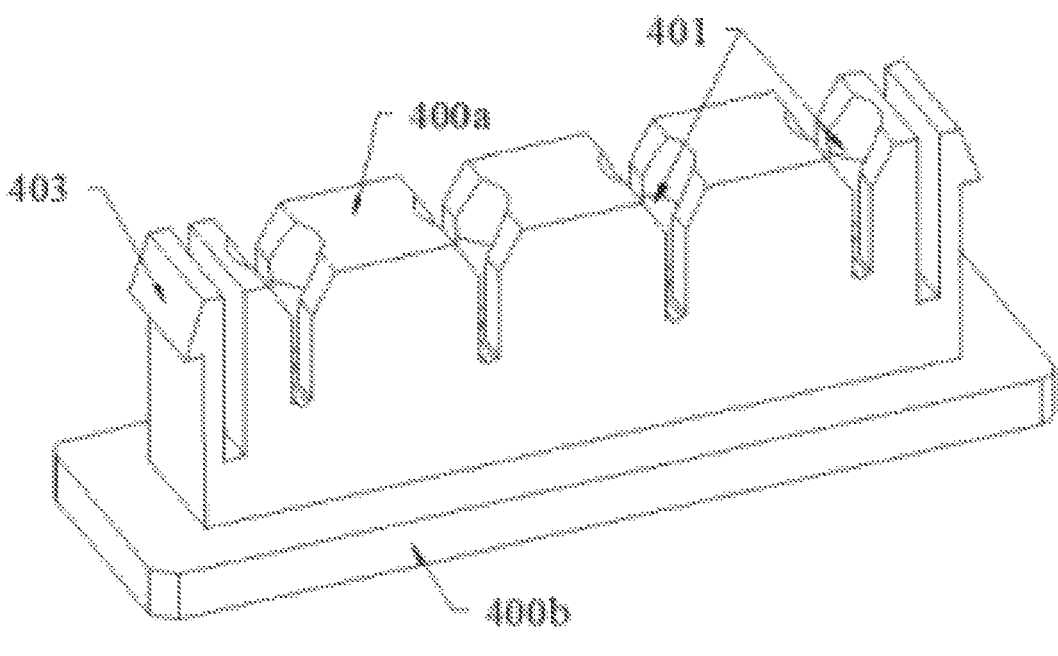
FIG. 5 is a perspective schematic structural diagram of an auxiliary mounting element according to some embodiments of this description.
Figure 6:
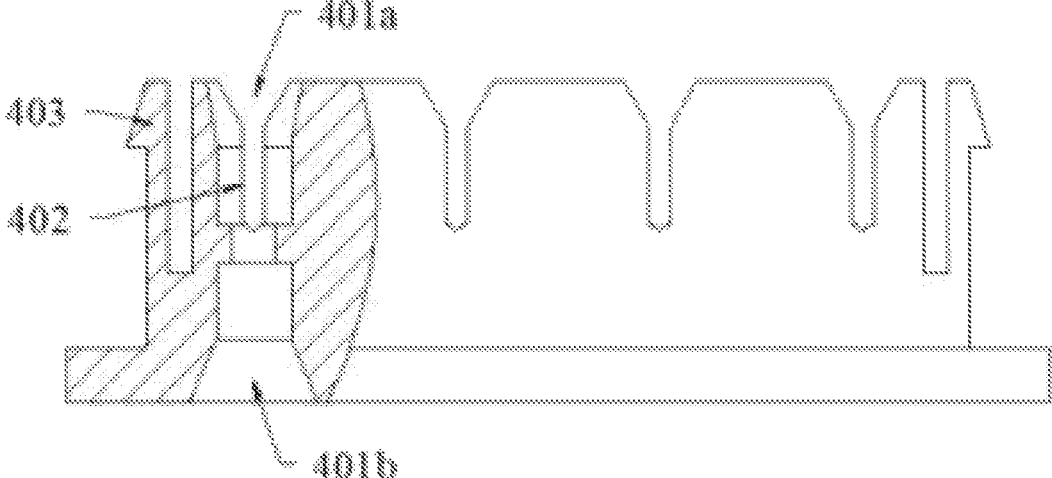
FIG. 6 is a partial cross-sectional view of an auxiliary mounting element according to some embodiments of this description.

The auxiliary mounting element 400 may be removably connected in the detection window 201 in various ways. FIGS. 5 and 6 are schematic diagrams of the auxiliary mounting element 400 according to some embodiments of this description. In some embodiments, the auxiliary mounting element 400 may be inserted into the detection window 201 from one side of the detection window 201, and the auxiliary mounting element 400 may be fixed to the detection window 201 by means of snap fit. For example, elastic claws 403 are symmetrically arranged on the auxiliary mounting element 400 in a length direction of the auxiliary mounting element, a groove fitting with the claws 403 may be arranged in the detection window 201 of the detection portion 200, and the auxiliary mounting element 400 is mounted and connected to the detection window 201 by fitting between the claws 403 and the groove. In some embodiments, the auxiliary mounting element 400 may be inserted into the detection window 201 from one side of the detection window 201, and the auxiliary mounting element 400 may be fixed to the detection window 201 by means of threaded connection.

In some other embodiments, the optical detection element may be directly connected to the detection window 201. For example, an end mounting member is fixedly connected to an end of the optical detection element, the optical detection element may be inserted into the detection window 201 at the end, and the optical detection element may be removably connected in the detection window 201 by means of the end mounting member at the end of the optical detection element, such that the detection window 201 exposes at least part of the unobstructed region by directly withdrawing the inserted optical detection element.

The shape of the detection window 201 may affect the formation of the unobstructed region and the arrangement of the capillary. In some embodiments, the detection window 201 may be rectangle-like. Specifically, the rectangle-like refers to a closed pattern that satisfies the following conditions: At least a first rectangle exists, such that the area of a non-overlapping region between the closed pattern and the first rectangle accounts for less than 15% of the area of the closed pattern. For example, the detection window 201 may be in the form of a rectangle, a rounded rectangle or a chamfered rectangle. In some embodiments, preferably, the detection window 201 is rectangular, the detection window 201 can accommodate and allow at least one capillary to pass through, and each capillary may pass through the detection window 201 in a width direction of the detection window 201. Specifically, the rectangular detection window 201 can allow a capillary to pass through the detection window 201 along the shortest path and reduce the length of an uncooled capillary, the detection window 201 can accommodate a plurality of capillaries side by side in a length direction, and an unobstructed region for cleaning the capillary may be formed on a periphery of each capillary.

The rectangular detection window 201 may facilitate the arrangement of a single capillary channel or a plurality of capillary channels. In some embodiments, the clip body may be loaded with a single capillary, and a detected section of the capillary is arranged in the width direction of the detection window 201; and the detected section of the capillary may be located in the middle of the detection window 201 in the length direction of the detection window 201, such that an unobstructed space for cleaning the capillary may be formed on the periphery of the capillary. In some embodiments, the clip body may be loaded with a plurality of capillaries, and a detected section of each capillary is arranged in the width direction of the detection window 201. In the length direction of the detection window 201, the detected sections of the plurality of capillaries are equidistantly spaced apart in parallel, and the detected sections of the plurality of capillaries are substantially located in the same plane, such that generally the same unobstructed space may be formed on the periphery of each capillary.

A length-width ratio of the rectangular detection window 201 may affect the formation of the unobstructed region. In some embodiments, the ratio of the length to the width of the detection window 201 is greater than or equal to 2. Specifically, the detection window 201 can allow a detected section (s) of one or more capillaries to be arranged, and the length-width ratio of the detection window 201 increases with number of capillaries, so as to ensure that an unobstructed region is formed on the periphery of each capillary. In some embodiments, in order to optimize the layout, detected sections of a plurality of capillaries are equidistantly spaced apart in parallel in the detection window 201, and a ratio of a spacing between adjacent detected sections of the capillaries to the width of the detection window 201 may be about 0.8, 0.9, 1.0, 1.1, 1.2, 1.3, 1.4, 1.5, 1.6, 1.7, 1.8, 1.9 or 2.0. Further included are any ranges featuring combinations of the above end values, including but not limited to from about 0.8 to about 2.0, from about 1.0 to about 2.0, from about 1.2 to about 2.0, from about 1.4 to about 2.0, from about 1.6 to about 2.0, from about 1.8 to about 2.0, from about 0.8 to about 1.8, from about 0.8 to about 1.6, from about 0.8 to about 1.4, from about 0.8 to about 1.2, and from about 0.8 to about 1.0. In some embodiments, preferably, the ratio of the spacing between adjacent detected sections of the capillaries to the width of the detection window 201 may be in a range from about 1.0 to 1.4.

The optical detection element may comprise one or more components of the detection system of the capillary electrophoresis apparatus. In some embodiments, the optical detection element may comprise one of or any combination of an incident optical fiber, an emergent optical fiber, and a detector. For example, the optical detection element may comprise an incident optical fiber and an emergent optical fiber. For example, the optical detection element may comprise an incident optical fiber, an emergent optical fiber, and a detector. In some embodiments, preferably, the optical detection element may comprise an incident optical fiber and an emergent optical fiber.

In some embodiments, the number of the optical detection elements corresponds to the number of the capillaries loaded in the clip body; and the number of the auxiliary mounting elements 400 or the number of the mounting positions of the optical detection elements on the auxiliary mounting elements 400 correspond to the number of the optical detection elements. In some embodiments, the clip body may be loaded with a single capillary. The single capillary has a corresponding optical detection element that may optically detect the single capillary, and the optical detection element can be removably mounted in the detection window 201 by means of the auxiliary mounting element 400. In some embodiments, the clip body may be loaded with at least two capillaries, and is equipped with at least two optical detection elements to optically detect the at least two capillaries. Each capillary has a corresponding optical detection element. The at least two optical detection elements may be removably mounted in the detection window 201 by means of their respective auxiliary mounting elements 400, or may be removably mounted in the detection window 201 in the mounting positions of the at least two optical detection elements on the same auxiliary mounting element 400.

Figure 7:
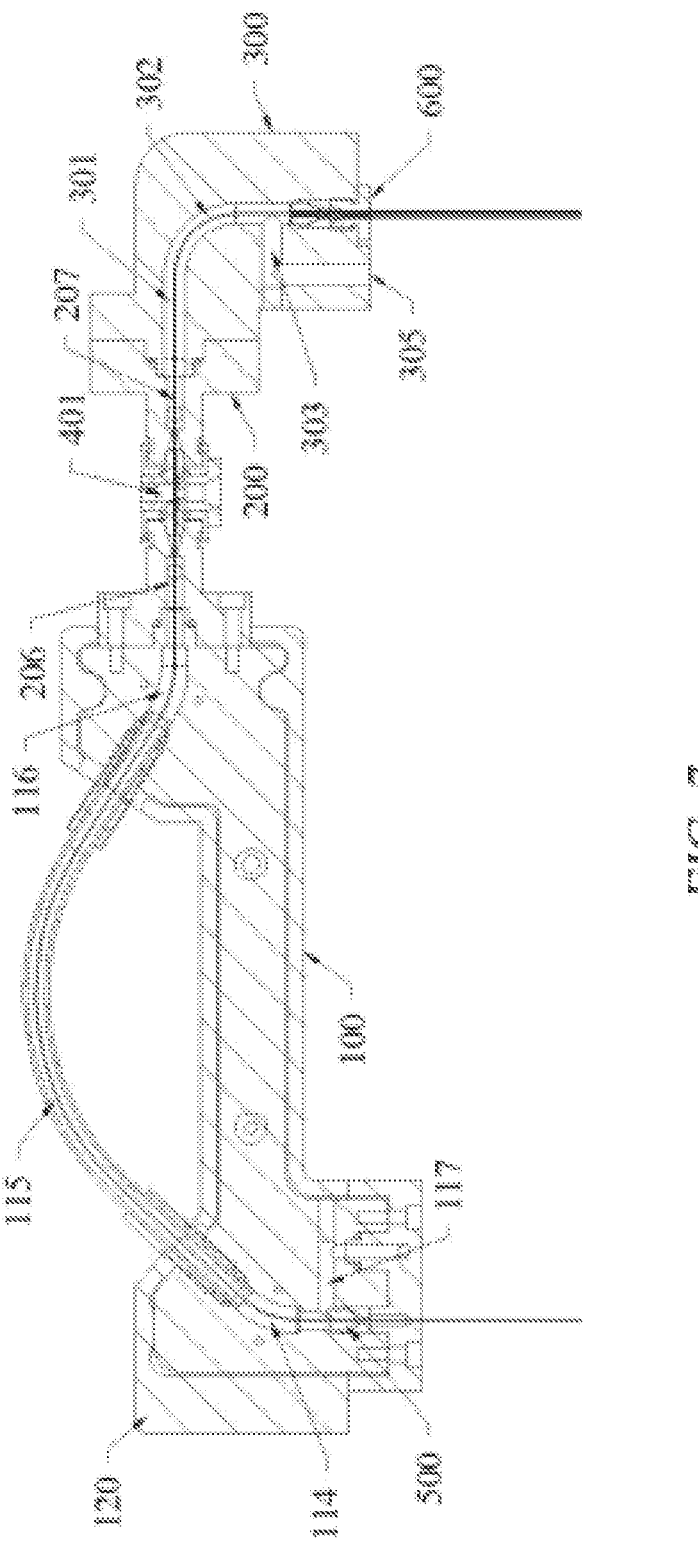
FIG. 7 is a cross-sectional view of a capillary clip according to some embodiments of this description.

The auxiliary mounting element 400 may provide structural support for the approaching of the optical detection element to the capillary for optical detection. FIG. 7 is a cross-sectional view of a capillary clip according to some embodiments of this description. In some embodiments, as shown in FIGS. 3 to 7, the auxiliary mounting element 400 may be provided with a chamber 401 which runs through the auxiliary mounting element 400, and the chamber 401 may be configured to avoid the capillary and guide the optical detection element to be positioned and be aligned with the capillary. Specifically, the chamber 401 has a first open end 401a and second end 401b. The first end 401a and the second end 401b may be configured for optical detection elements to be inserted oppositely or approximately oppositely, such that the optical detection elements are positioned and aligned with a detected section of the capillary traversing the chamber 401. Avoidance grooves 402 are symmetrically provided in chamber walls close to the first end 401a. During mounting and removal, the auxiliary mounting element 400 is inserted into or removed from the detection window 201 in a direction generally perpendicular to the detected section of the capillary. The avoidance grooves 402 each may be configured to make the chamber wall of the chamber 401 avoid the detected section of the capillary in this process, so as to prevent the chamber wall of the chamber 401 from squeezing or pressing the detected section of the capillary. In some embodiments, further, the avoidance groove 402 may be generally V-shaped, and the V-shaped avoidance groove 402 may be configured to provide auxiliary positioning for the capillary, so as to ensure that the optical detection element can be accurately positioned and aligned with the detected section of the capillary.

There may be one or more chambers 401 of the auxiliary mounting element 400. The number of chambers 401 may correspond to the number of capillaries that can be loaded in the clip body and the number of optical detection elements that correspondingly detect the capillaries. In some embodiments, the clip body may be loaded with a single capillary, and the auxiliary mounting element 400 correspondingly has a chamber 401 in which an optical detection element for optically detecting the single capillary is mounted. In some embodiments, the clip body may be loaded with a plurality of capillaries, and the auxiliary mounting element 400 correspondingly has a plurality of chambers 401 in communication with each other. A plurality of optical detection elements are provided to optically detect corresponding capillaries of the plurality of capillaries, and each optical detection element is mounted inside a corresponding chamber 401. In some embodiments, preferably, the clip body may be loaded with a plurality of capillaries, and the auxiliary mounting element 400 correspondingly has a plurality of chambers 401 isolated from each other, a plurality of optical detection elements are provided to optically detect corresponding capillaries of the plurality of capillaries, and each optical detection element is mounted in a corresponding chamber 401. Specifically, the plurality of chambers 401 are isolated from each other, and each chamber 401 may be detected independently without interference from adjacent chambers 401, thus effectively ensuring detection sensitivity.

In some embodiments, the optical detection element is detachably connected to the auxiliary mounting element 400. For example, the optical detection element may comprise an incident optical fiber and an emergent optical fiber. The incident optical fiber and the emergent optical fiber may be respectively inserted into the chamber 401 from the first end 401a and the second end 401b of the chamber 401 of the auxiliary mounting element 400, and the incident optical fiber and the emergent optical fiber are fixed in the chamber 401 of the auxiliary mounting element 400 by means of snap-fit connection. In some embodiments, the optical detection element may comprise an incident optical fiber and an emergent optical fiber. One of the incident optical fiber and the emergent optical fiber is detachably connected to the auxiliary mounting element 400, and the other of the incident optical fiber and the emergent optical fiber is detachably connected to the auxiliary mounting element 400. For example, the incident optical fiber of the optical detection element is inserted into the chamber 401 from the second end 401b of the chamber 401 of the auxiliary mounting element 400, and the incident optical fiber is fixed to the second end 401b of the chamber 401 by bonding. An insertion end 400a of the auxiliary mounting element 400 (the first end 401a of the chamber 401 is located at the insertion end 400a of the auxiliary mounting element 400) passes through the detection window 201 to fix the auxiliary mounting element 400 to the detection window 201, and the emergent optical fiber of the optical detection unit is fixed to the insertion end 400a of the auxiliary mounting element 400 by means of snap-fit connection.

The optical detection element forms an optical detection path with the cooperation of the auxiliary mounting element 400. In some embodiments, the optical detection element forms an optical detection path perpendicular to the capillary. For example, the optical detection element may comprise an incident optical fiber and an emergent optical fiber. The incident optical fiber is mounted at a second end 401b of a chamber 401 of the auxiliary mounting element 400, and the emergent optical fiber is mounted at a first end 401a of the chamber 401. A detected section of the capillary traversing the chamber 401 is located between the incident optical fiber and the emergent optical fiber. A positioning function of the chamber 401 allows a leading end of the incident optical fiber and a collecting end of the emergent optical fiber to approach the detected section of the capillary in a direction generally perpendicular to the detected section of the capillary, and the leading end and the collecting end are located on the same extension line, such that the optical detection element forms an optical detection path perpendicular to the capillary. For another example, the incident optical fiber and the emergent optical fiber of the optical detection element are respectively mounted at the second end 401*b* and the first end 401*a* of the chamber 401 of the auxiliary mounting element 400, the leading end of the incident optical fiber and the collecting end of the emergent optical fiber approach the detected section of the capillary in a direction generally perpendicular to the detected section of the capillary, and an extension line of the leading end intersects with an extension line of the collecting end at an obtuse angle, such that the optical detection element forms an optical detection path perpendicular to the capillary.

Figure 8:
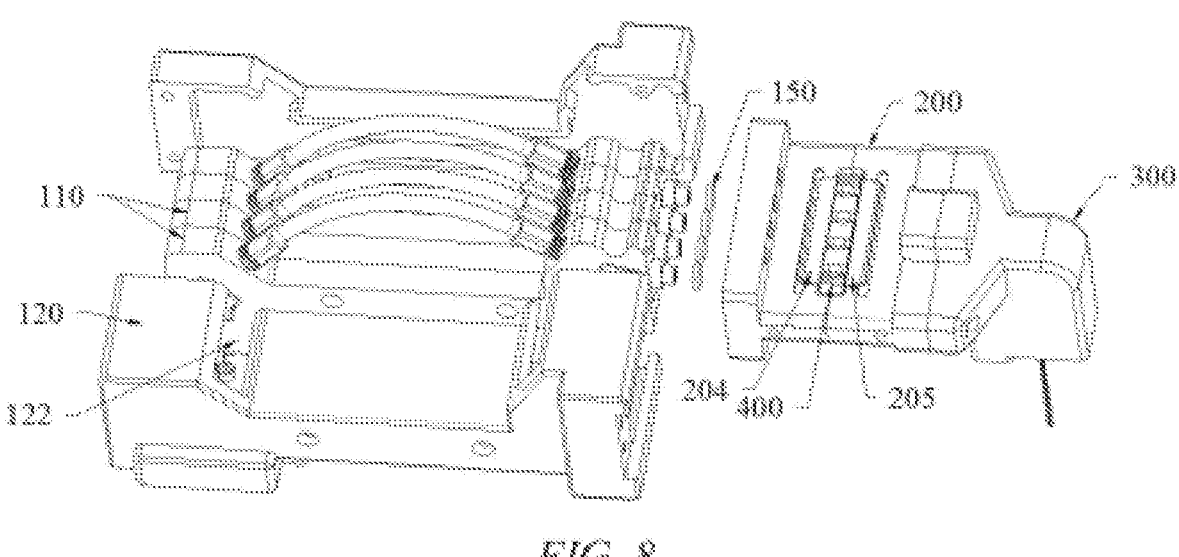
FIG. 8 is a schematic diagram of an inlet segment clip portion of a capillary clip according to some embodiments of this description in a disassembled state.

The inlet segment clip portion 100 may be configured to load most of a capillary body from a starting end of the capillary to the detected section of the capillary. FIG. 8 is a schematic diagram of the inlet segment clip portion 100 of the capillary clip according to some embodiments of this description in a disassembled state. In some embodiments, as shown in FIG. 8, the inlet segment clip portion 100 comprises one or more single-channel clips 110. Specifically, each single-channel clip 110 may be loaded with a capillary.

In some embodiments, the single-channel clip 110 comprises a single-body clip 111 and a connecting tube 112, wherein two ends of the connecting tube 112 are connected to the single-body clip 111. Specifically, the connecting tube 112 may be mainly used to load a capillary and a circulating refrigerant, and the single-body clip 111 may be configured to provide structural support for the connecting tube 112. The combination of the connecting tube and the single-body clip may minimize a space occupied by the single-channel clip 110 and reduce the weight.

Figure 9:
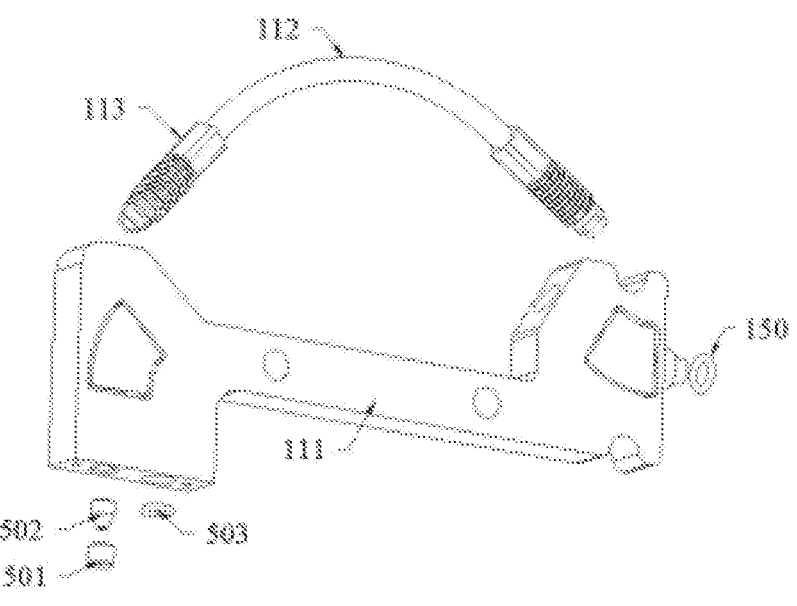
FIG. 9 is a schematic diagram of a single-channel clip according to some embodiments of this description in a disassembled state.

In some embodiments, the two ends of the connecting tube 112 are detachably connected to the single-body clip 111. Specifically, the detachable connecting tube 112 facilitates replacement, and replacement with a connecting tube 112 with a different length allow the capillary clip to adapt to the requirements of separating a different sample. For example, as shown in FIG. 9, the two ends of the connecting tube 112 may be connected and fixed to the single-body clip 111 by means of a threaded joint assembly 113. In some embodiments, preferably, the connecting tube 112 is a rigid tube. Specifically, the rigid tube is likely to maintain its basic form, which facilitates passage of the capillary on one hand and can avoid excess bending of the capillary on the other hand.

The inlet segment clip portion 100 may have a shell. In some embodiments, the inlet segment clip portion 100 further comprises a detachable segment clip housing 120, and the segment clip housing 120 is mounted on a periphery of the single-channel clip 110. Specifically, the segment clip housing 120 can provide external protection for the single-channel clip 110. The segment clip housing 120 may cover the entire single-channel clip 110 of the inlet segment clip portion 100, or expose some components from the housing. In some embodiments, preferably, at least part of a tube body of the connecting tube 112 is exposed from the segment clip housing 120. Specifically, one or two corresponding openings 122 are provided in the segment clip housing 120 so as to facilitate the exposure of the connecting tube 112 from the segment clip housing 120. This exposed structure of the connecting tube 112 may meet the requirement for replacement with a connecting tube 112 with a different length for the capillary clip.

Figure 10:
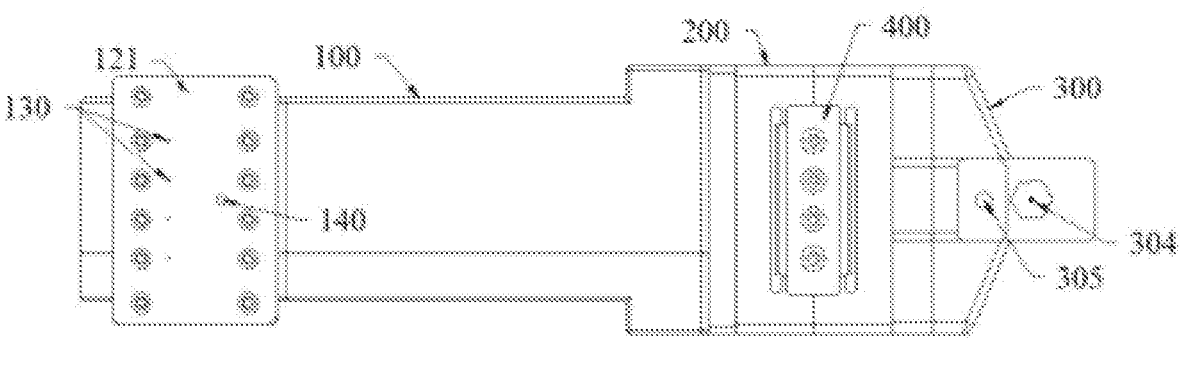
FIG. 10 is a bottom view of a capillary clip according to some embodiments of this description.

In some embodiments, the segment clip housing 120 may comprise a plurality of housing components that are detachably connected to each other. In some embodiments, the segment clip housing 120 may comprise a first housing, a second housing, and an inlet end sealing plate 121. In some embodiments, as shown in FIGS. 8 and 10, the first housing and the second housing can be assembled and connected in a width direction of the single-channel clip 110 (i.e., a left-right direction of the single-channel clip 110) to form a housing body. In some embodiments, the first housing and the second housing may be assembled and connected in a height direction of the single-channel clip 110 (i.e., a vertical direction of the single-channel clip 110) to form a housing body. In some embodiments, the first housing and the second housing may be assembled and connected in a length direction of the single-channel clip 110 (i.e., a front-rear direction of the single-channel clip 110) to form the housing body. In some embodiments, the inlet end sealing plate 121 is mounted at the bottom of the housing body, the inlet end sealing plate 121 may be provided with a capillary channel inlet and a main liquid inlet of the refrigerant channel, and removing the inlet end sealing plate 121 may expose the inlets of the capillary channel and the refrigerant channel of the single-channel clip 110 from the bottom of the housing body.

For the inlet segment clip portion 100 with a plurality of single-channel clips 110, the single-channel clips 110 may be mounted and fixed in various ways.

In some embodiments, the inlet segment clip portion 100 may comprise a plurality of single-channel clips 110 that may be separated from each other. Specifically, the inlet segment clip portion 100 may comprise at least two single-channel clips 110, and the detachable single-channel clips 110 facilitate the mounting and removal of the capillary and the capillary clip.

In some embodiments, a plurality of single-channel clips 110 are relatively fixed by the segment clip housing 120. For example, a plurality of mounting grooves are provided in the segment clip housing 120, and each single-channel clip 110 is mounted in a corresponding mounting groove, such that the plurality of single-channel clips 110 are relatively fixed. For another example, a fastener is arranged between the segment clip housing 120 and each single-channel clip 110, and the single-channel clip 110 is fixed in the segment clip housing 120 by the fastener, such that the plurality of single-channel clips 110 are relatively fixed.

In some embodiments, a plurality of single-channel clips 110 are detachably connected to each other. For example, the plurality of single-channel clips 110 are fixed by means of threaded connection and connected as a unit. For another example, the plurality of single-channel clips 110 are fixed by snap-fit connection and connected as a unit.

In some embodiments, further, a plurality of single-channel clips 110 are fixed in the segment clip housing 120 by means of threaded connection. Specifically, since the capillary clip can be assembled and disassembled in a modular manner, in order to meet requirements of accurate alignment and sealing between the capillary channel and the refrigerant channel, the single-channel clip 110 may be connected and reinforced to the segment clip housing 120.

A clip body of a multi-channel capillary clip is loaded with a plurality of capillaries. The outlet combination portion 300 may be configured to combine the plurality of capillaries at a tail end of a capillary separation path, such that electrolytes and samples carried by the plurality of capillaries are recycled into the same recycling bottle, which facilitates simplification of the structure of the capillary electrophoresis apparatus.

In some embodiments, the outlet combination portion 300 may comprise a combining sealing body, and a plurality of combined channels 301 independent of each other may be provided in the combining sealing body. Each combined channel 301 may be loaded with a capillary, and the plurality of combined channels 301 tend to gradually converge in a direction from a capillary inlet to a capillary outlet of the combining sealing body, such that a plurality of capillaries converge at the capillary outlet of the combining sealing body. Specifically, the plurality of combined channels 301 in the combining sealing body are formed by a plurality of capillary channels that tend to converge.

In some embodiments, as shown in FIG. 7, the outlet combination portion 300 may comprise a combining sealing body, there may be a combined channel 301 in the combining sealing body, and a plurality of capillaries converge in the combined channel 301. Specifically, the combined channel 301 may be formed by causing a plurality of capillary channels loaded with capillaries in the clip body to converge in the combining sealing body, and the combining sealing body of a single combined channel facilitates manufacturing and mounting.

To adjust an exposed end length of a capillary, in some embodiments, the combined channel 301 has a bent portion 302, and the bent portion 302 can allow the capillaries in the combined channel 301 to adjust their exposed end lengths. Specifically, the exposed end length of a capillary refers to a length by which the capillary extends from the clip body. For a multi-channel capillary clip, the lengths of a plurality of capillaries loaded in the clip body should be kept consistent to ensure the consistent resolution. The combination of a plurality of capillaries by the outlet combination portion 300 may lead to inconsistent exposed end lengths of the capillaries and uneven exposed end positions of the capillaries after the combination, which does not facilitate operations such as pressurization and liquid recovery. The plurality of capillaries can be bent to different extents at the bent portion 302 of the combined channel 301, such that the plurality of capillaries may have the same exposed end length.

The clip body may define at least one capillary channel. It should be noted that "define" means that the clip body forms capillary channels by space restriction, and some channels (such as some capillary channels located in the detection window 201) of the capillary channels may have no substantially tangible wall. The capillary channels are configured to load capillaries, and the capillary channels can allow a refrigerant to circulate. Each capillary channel may be loaded with one capillary. A clip body of a single-channel capillary clip may define one capillary channel. A clip body of a multi-channel capillary clip may define at least two capillary channels.

As shown in FIG. 7, the capillary channel may be formed by splicing and combining a plurality of channels. In some embodiments, each capillary channel may comprise a first channel defined by the inlet segment clip portion 100, a second channel defined by the detection portion 200, and a combined channel 301 defined by the outlet combination portion 300, and the first channel, the second channel and the combined channel 301 are sequentially in communication with each other. In some embodiments, the first channel may further comprise a clip inlet channel 114, a connecting channel 115 and a clip outlet channel 116 that are sequentially in communication with each other. The connecting channel 115 is formed by the connecting tube 112 of the single-channel clip 110, and the clip inlet channel 114 and the clip outlet channel 116 are formed in the single-body clip 111. In some embodiments, the second channel may further comprise a detection inlet channel 206, a window channel and a detection outlet channel 207 that are sequentially in communication with each other. The window channel is located in the detection window 201, and the detection inlet channel 206 and the detection outlet channel 207 are formed in the window body. It may be understood that the window channel has no substantially tangible wall, and the window channel may be understood as a passage path for a capillary from an outlet of the detection inlet channel 206 to an inlet of the detection outlet channel 207. In some embodiments, the combined channel 301 is formed in a combining sealing block.

For a multi-channel capillary clip, a plurality of capillary channels thereof are arranged side by side, the first channel and the second channel of each capillary channel are generally in the same plane, and the first channels and the second channels of the plurality of capillary channels are generally in different planes parallel to each other. The side-by-side arrangement of the above plurality of capillary channels is favorable for simultaneous multi-channel detection.

The clip body may define a refrigerant channel. The refrigerant channel may be used to introduce a refrigerant into some channels of each capillary channel, circulate the refrigerant, and circularly cool the capillary loaded in the capillary channel. In some embodiments, the refrigerant channel and each capillary channel are combined at the inlet segment clip portion 100 and the outlet combination portion 300, and the refrigerant channel and each capillary channel are separated at the detection portion 200. In some embodiments, the refrigerant channel may further comprise a refrigerant inlet channel 117, a channel branch 208, and a refrigerant outlet channel 303.

In some embodiments, as shown in FIG. 7, the refrigerant inlet channel 117 is formed in the inlet segment clip portion 100, a liquid inlet of the refrigerant inlet channel 117 is in communication with a main refrigerant inlet 140 of the clip body, and a liquid outlet of the refrigerant inlet channel 117 may be in communication with the first channel of the capillary channel, such that the refrigerant channel merges with the first channel. Specifically, in order to improve cooling efficiency and ensure a cooling effect, most of the capillary body of the capillary is in a circulating and cooling state, and the refrigerant inlet channel 117 is in communication with the clip inlet channel 114 of the capillary channel, such that the refrigerant flows from the clip inlet channel 114 into the connecting channel 115 and the clip outlet channel 116 in sequence. A refrigerant channel of a single-channel capillary clip may comprise one refrigerant inlet channel 117. A refrigerant channel of a multi-channel capillary clip may comprise a plurality of refrigerant inlet channels 117.

In some embodiments, as shown in FIG. 2, the channel branch 208 is formed in the detection portion 200, and two ends of the channel branch 208 may be respectively in communication with an inlet end and an outlet end of the second channel of the capillary channel, such that the refrigerant flows out of the capillary channel and circulates around the detection window 201. Specifically, a liquid inlet of the channel branch 208 may be in communication with the detection inlet channel 206 of the capillary channel, an inlet end sealing component 209 allowing only a capillary to pass through is arranged at an outlet of the detection inlet channel, and the first positioning seal 204 allows the inlet end sealing component 209 to press tightly against the outlet of the detection inlet channel 206 to form a seal. A liquid outlet of the channel branch 208 may be in communication with the detection outlet channel 207 of the capillary channel, and an outlet end sealing component 210 allowing only a capillary to pass through is arranged at an inlet of the detection outlet channel 207. The outlet end sealing component 210 may be arranged in the outlet window body 203, and the second positioning seal 205 allows the outlet end sealing component 210 to press tightly against the inlet of the detection outlet channel 207 to form a seal.

A refrigerant channel of a single-channel capillary clip may comprise one channel branch 208. A refrigerant channel of a multi-channel capillary clip may comprise one or more channel branches 208. For example, the clip body may be loaded with four capillaries, and the refrigerant channel may comprise one channel branch 208. A liquid inlet of the channel branch 208 is in communication with four detection inlet channels 206, and a liquid outlet of the channel branch 208 is in communication with four detection outlet channels 207. For another example, as shown in FIG. 2, the refrigerant channel may comprise two channel branches 208. The two channel branches 208 are symmetrically arranged on two sides of the detection window 201. A liquid inlet of each channel branch 208 is in communication with two detection inlet channels 206, and a liquid outlet of the channel branch 208 is in communication with two detection outlet channels 207.

In some embodiments, the refrigerant outlet channel 303 is formed in the outlet combination portion 300, a liquid inlet of the refrigerant outlet channel 303 is in communication with a third channel, and a liquid outlet of the refrigerant outlet channel 303 is in communication with a main refrigerant outlet 305 of the clip body. Specifically, in order to improve cooling efficiency and ensure the cooling effect, most of the capillary body of the capillary can be kept in a circulating and cooling state.

A refrigerant channel of a single-channel capillary clip may comprise one refrigerant outlet channel 303. A refrigerant channel of a multi-channel capillary clip may comprise one or more refrigerant outlet channels 303. For example, the clip body may be loaded with eight capillaries, and correspondingly, the clip body defines eight capillary channels; the third channels of the eight capillary channels converge at the outlet combination portion 300 to form a combined channel 301, and the refrigerant channel comprises a refrigerant outlet channel 303, a liquid inlet of the refrigerant outlet channel 303 being in communication with the combined channel 301. For another example, the clip body may be loaded with six capillaries, and correspondingly, the clip body defines six capillary channels; the third channels of the six capillary channels gradually gather at the outlet combination portion 300, the six third channels that gradually gather and tend to be combined are six combined channels 301, and the refrigerant channel comprises six refrigerant outlet channels 303, a liquid inlet of each refrigerant outlet channel 303 being in communication with a corresponding combined channel 301.

FIG. 10 is a bottom view of a capillary clip according to some embodiments of this description. In order to reduce the size of the capillary clip and facilitate sample introduction, in some embodiments, as shown in FIG. 10, the capillary channel inlet 130 and the main refrigerant inlet 140 of the clip body are arranged at the bottom of the inlet segment clip portion 100, and a capillary channel outlet 304 and a main refrigerant outlet 305 of the clip body are arranged at the bottom of the combining sealing body.

In order to ensure sealing performance of the capillary channel and the refrigerant channel, in some embodiments, an inlet end sealing assembly 500 is provided for the capillary channel inlet 130, and an outlet end sealing assembly 600 is provided for the capillary channel outlet 304. For example, as shown in FIG. 4, the capillary channel inlet 130 of the clip body is arranged in the inlet end sealing plate 121 at the bottom of the segment clip housing 120, and an inlet end rubber sealing head 501 and an inverted inlet end sealing cone 502 are sequentially arranged between the inlet end sealing plate 121 and an inlet of the clip inlet channel 114 of the single-body clip 111. For example, the capillary channel outlet 304 is provided at the bottom of the combining sealing body, and an outlet end rubber sealing head 601 and an inverted outlet end sealing cone 602 are arranged on the capillary channel outlet 304. The outlet end rubber sealing head 601 and the inverted outlet end sealing cone 602 are locked to the capillary channel outlet 304 by means of an outlet end sealing nut 603. In some embodiments, the main refrigerant inlet 140 is sealed by providing a first seal ring 503, and the main refrigerant outlet 305 is sealed by providing a second seal ring.

The clip body may be of a modular and detachable structure, that is, the inlet segment clip portion 100, the detection portion 200 and the rear combination portion of the clip body are detachably connected. In order to ensure overall sealing performance, in some embodiments, sealed connections between the inlet segment clip portion 100 and the detection portion 200 and between the detection portion 200 and the outlet combination portion 300 are formed by providing internal sealing assemblies. For example, a third seal ring 150 may be arranged between an outlet of the clip outlet channel 116 of the inlet segment clip portion 100 and an inlet of the detection inlet channel 206 of the detection portion 200 for sealing. For example, a fourth seal ring 211 may be arranged between an outlet of the detection outlet channel 207 of the detection portion 200 and the combined channel 301 of the outlet combination portion 300 for sealing.

In some embodiments, as shown in FIGS. 2 and 7, the refrigerant circulates in the clip body as follows. The refrigerant enters the clip body from the main refrigerant inlet 140 of the inlet segment clip portion 100, and the refrigerant entering the clip body first flows into the clip inlet channel 114 of the first channel through the inlet channel. The refrigerant sequentially flows through the clip inlet channel 114, the connecting channel 115 and the clip outlet channel 116 before entry into the detection portion 200. The refrigerant flows into the detection portion 200 through the detection inlet channel 206 of the second channel. Since the inlet end sealing component 209 is arranged at the outlet of the detection inlet channel 206 of the second channel, and the window channel for detection allows only a capillary to pass through, the refrigerant in the detection inlet channel 206 flows into the detection outlet channel 207 through the channel branch 208 before entry into the outlet combination portion 300. The refrigerant flows into the outlet combination portion 300 through the third channel, i.e., the combined channel 301. The outlet end sealing assembly 600 is arranged at the outlet of the combined channel 301, and the outlet end sealing assembly 600 allows only a capillary to pass through, so the refrigerant in the combined channel 301 flows out of the outlet combination portion 300 through the refrigerant outlet channel 303 and the main refrigerant outlet 305 in sequence. It may be understood that the channels of the capillary channel, other than the window channel of the capillary channel, are filled with the circulating refrigerant. In some embodiments, the refrigerant may comprise a liquid refrigerant, a gaseous refrigerant, a gas-liquid mixed refrigerant, and a solid-liquid mixed refrigerant. For example, low-temperature distilled water may circulate in the refrigerant channel, or low-temperature atomized distilled water may circulate in the refrigerant channel may circulate, or an ice-water mixture may circulate in the refrigerant channel.

Specifically, on one hand, the arrangement of the above refrigerant channel and the capillary channel may significantly reduce the overall amount of the refrigerant used and reduce damages caused by refrigerant leakage to internal components of the capillary electrophoresis apparatus in extreme cases; and on the other hand, since most of the capillary body of the capillary may be placed in temperature-controlled environment formed by the refrigerant, the temperature of the capillary may be controlled efficiently and stably, and thus the accuracy of detection results is high.

The clip body may allow capillary passage to be performed in many ways. In some embodiments, a capillary passage and mounting step may generally comprise: a) assembling and connecting the inlet segment clip portion 100 to the detection portion 200, and passing the capillary in a direction from an outlet end side of the detection portion 200 to an inlet end side of the inlet segment clip portion 100 such that an inlet end of the capillary extends from a capillary inlet at the bottom of the inlet segment clip portion 100; b) adjusting the position of the capillary such that the detected section of the capillary is located in the detection window 201, that is, the detected section of the capillary is located in a window channel section. c) mounting the inlet end sealing assembly 500 at the capillary inlet to seal the capillary inlet; d) passing the outlet end of the capillary into the outlet combination portion 300 handout of the capillary outlet at the bottom of the outlet combination portion 300; e) mounting the outlet end sealing assembly 600 at the capillary outlet; and f) inserting the auxiliary mounting element 400 into the detection window 201 such that the capillary is pressed tightly and positioned.

Specifically, with respect to capillary passage and mounting, since the clip body is detachable, for difficult sections with irregular direction changes or large-angle bending in the capillary channel, capillary passage and clip body assembly are performed component by component and section by section by separating components in the difficulty sections. On the contrary, the capillary can also be removed by disassembly component by component and section by section. This can significantly reduce the loss of the capillary during mounting and removal, reduce mounting time, and reduce the maintenance difficulty and maintenance cost of the capillary clip.

An embodiment of this description further provides a capillary electrophoresis apparatus. The capillary electrophoresis apparatus comprises a capillary clip of any one of the embodiments described above.

An embodiment of this description further provides a method for using a capillary clip. This use method can be applied to a capillary clip of any one of the embodiments described above. The method for using a capillary clip described above may comprise the following steps.

In step S1, an inlet segment clip portion 100 and a detection portion 200 are assembled and connected, and the connected inlet segment clip portion 100 and detection portion 200 form a first assembled portion.

In step S2, one end (such as one end for sample introduction) of a capillary is guided to pass through a capillary channel of the first assembled portion, and a detected section of the capillary is positioned and aligned with a detection window 201 of the detection portion 200.

In step S3, the other end (such as one end for sample output) of the capillary is guided to pass through a capillary channel of an outlet combination portion 300, and the first assembled portion is assembled and connected to the outlet combination portion 300.

In step S4, an auxiliary positioning element that may be inserted into the detection window 201 and a sealing assembly for sealing an inlet and an outlet of the capillary channel are mounted.

In some embodiments, step S1 may further comprise a step of assembling the inlet segment clip portion 100. Specifically, assembling the inlet segment clip portion 100 may comprise the following steps: mounting and fixing two ends of a connecting tube 112 to a single-body clip 111 to form an integral single-channel clip 110; and inserting the single-channel clip 110 into a first housing of a segment clip housing 120, and the first housing and a second housing are closed in a width direction of the single-channel clip 110 and connected and fixed, such that a housing body formed by connecting the first housing to the second housing presses against the single-channel clip 110. In some embodiments, step S1 may further comprise a step of assembling the detection portion 200. Specifically, assembling the detection portion 200 may comprise the following steps: snap fitting a first positioning seal 204 to an inlet window body 202, snap fitting a second positioning seal 205 to an outlet window body 203, and hermetically connecting the inlet window body 202 to the outlet window body 203. In some embodiments, step S1 may further comprise a step of connecting the inlet segment clip portion 100 to the detection portion 200. Connecting the inlet segment clip portion 100 to the detection portion 200 may comprise the following steps. An outlet end of the single-channel clip 110 has a stepped convex cylindrical surface exposed from the segment clip housing 120, a third seal ring 150 is sleeved on the stepped convex cylindrical surface, the stepped convex cylindrical surface of the single-channel clip 110 is inserted into a stepped concave cylindrical surface of an inlet window body 202, and the inlet end of the inlet window body 202 is connected and fixed to the single-channel clip 110 to form a first assembled portion.

In some embodiments, step S2 may further comprise the following steps: guiding one end of the capillary to sequentially pass through capillary channels of the detection portion 200 and the inlet segment clip portion 100 in a direction from a capillary channel outlet 304 to a capillary channel inlet 130, until the detected section of the capillary is positioned and aligned with the detection window 201 of the detection portion 200, such that the detected section of the capillary is exposed from the detection portion 200 through the detection window 201 and one end of the capillary extends from the inlet segment clip portion 100.

In some embodiments, step S3 may further comprise a step of assembling the outlet combination portion 300. Specifically, the step of assembling the outlet combination portion 300 may comprise mounting a fourth seal ring 211 for sealing at an inlet end of a combining sealing body. In some embodiments, step S3 may further comprise a step of passing the other end of the capillary. Specifically, passing the other end of the capillary may comprise the following steps: guiding the other end of the capillary to pass through the capillary channel of the outlet combination portion 300 in a direction from the capillary channel inlet 130 to the capillary channel outlet 304, until the other end of the capillary extends from the outlet combination portion 300. In some embodiments, step S3 may further comprise a step of connecting the first assembled portion to the outlet combination portion 300. Specifically, connecting the first assembled portion to the outlet combination portion 300 may comprise the following steps. There is a stepped positioning convex surface at an inlet of a combined channel 301 of the outlet combination portion 300, the outlet window body 203 of the first assembled portion has a stepped positioning concave surface, the stepped positioning convex surface of the outlet combination portion 300 is inserted into the stepped positioning concave surface of the outlet window body 203, the fourth seal ring 211 is arranged between the stepped positioning convex surface and the stepped positioning concave surface, and the outlet combination portion 300 is connected and fixed to the first assembled portion to form an integral clip body.

In some embodiments, step S4 may further comprise a step of mounting the auxiliary positioning element. Specifically, mounting the auxiliary positioning element may comprise the following steps: inserting an insertion end 400a of the auxiliary positioning element into the detection window 201, and a non-insertion end 400b of the auxiliary positioning element having a limit flange, such that the auxiliary positioning element may be properly aligned with and mounted and fixed to the detection window 201.

In some embodiments, step S4 may further comprise a step of mounting an inlet end sealing assembly 500. Specifically, mounting the inlet end sealing assembly 500 may comprise the following steps: sequentially sleeving an inverted inlet end sealing cone 502 and an inlet end rubber sealing head 501 on one end of the capillary extending from the inlet segment clip portion 100, mounting an inlet end sealing plate 121 on the housing body, and passing one end of the capillary through the capillary channel inlet 130 located in the inlet end sealing plate 121. In some embodiments, step S4 may further comprise a step of mounting an outlet end sealing assembly 600. Specifically, mounting the outlet end sealing assembly 600 may comprise the following steps: sequentially sleeving an inverted outlet end sealing cone 602, an outlet end rubber sealing head 601 and an outlet end sealing nut 603 on the other end of the capillary extending from the outlet combination portion 300, and rotating the outlet end sealing nut 603 such that the outlet end sealing nut 603 is locked to the outlet combination portion 300.

In some alternative embodiments, the method for using a capillary clip may comprise the following steps.

In step S1', an inlet segment clip portion 100 is assembled.

In step S2', one end (such as one end for sample introduction) of a capillary is guided to pass through the inlet segment clip portion 100.

In step S3', a detection portion 200 and an outlet combination portion 300 are assembled and connected, and the connected detection portion 200 and outlet combination portion 300 form a second assembled portion.

In step S4', the other end (such as one end for sample output) of the capillary is guided to pass through a capillary channel of the second assembled portion, a detected section of the capillary is positioned and aligned with a detection window 201 of the detection portion 200, and a first assembled portion is connected to the outlet combination portion 300.

In step S5', an auxiliary positioning element that may be inserted into the detection window 201 and a sealing assembly for sealing an inlet and an outlet of the capillary channel are mounted.

In some alternative embodiments, the method for using a capillary clip may comprise the following steps.

In step S1", a detection portion 200 is assembled.

In step S2", one end (such as one end for sample introduction or one end for sample output) of a capillary is guided to pass through a capillary channel of the detection portion 200, and a detected section of the capillary is positioned and aligned with a detection window 201 of the detection portion 200.

In step S3", an inlet segment clip portion 100 is assembled.

In step S4", one end (such as one end for sample introduction) of the capillary is guided to pass through a capillary channel of the inlet segment clip portion 100, and the detection portion 200 is connected to the inlet segment clip portion 100.

In step S5", an outlet combination portion 300 is assembled.

In step S6", the other end (such as one end for sample output) of the capillary is guided to pass through a capillary channel of the outlet combination portion 300, and the detection portion 200 is connected to the outlet combination portion 300.

In step S7", an auxiliary positioning element that may be inserted into the detection window 201 and a sealing assembly for sealing an inlet and an outlet of the capillary channel are mounted.

It may be understood that the method for using a capillary clip described above can effectively reduce stressed stretching or bending of the detected section of the capillary and reduce the mounting and removal loss of the capillary. In addition, the method for using a capillary clip described above separates sections in the capillary channel that have high difficulty in passage, and the time for mounting and removal can be greatly reduced by passage section by section.

The capillary clip and the capillary electrophoresis apparatus disclosed in the embodiments of this description may have beneficial effects including but not limited to: (1) the capillary clip according to the embodiments of this description can conveniently clean and maintain the capillary at a low cost; (2) the capillary clip according to the embodiments of this description has an optimized structure and layout, and features multi-channel detection and high efficiency; and (3) the capillary clip according to the embodiments of this description can be assembled and disassembled in a modular manner, which can reduce the time of assembly operations, reduce the loss of a capillary during assembly and disassembly, and reduce costs. It should be noted that different embodiments may have different beneficial effects, and the beneficial effects that may be produced in the different embodiments may be any one or a combination of the above, or may be any other beneficial effects that may be obtained.

It should be understood by those skilled in the art that the above embodiments are only for illustrating the present invention, and do not limit the present invention. Any modifications, equivalent substitutions, changes, and the like made within the spirit and principle of the present invention should fall within the scope of protection of the present invention.

What is claimed is:

1. A capillary clip, comprising:

at least one capillary channel, a capillary being mounted in the capillary channel;

a clip body defining the at least one capillary channel;

a detection window provided on the clip body; and at least one optical detection element directly or indirectly connected in the detection window, wherein the at least one optical detection element is removable from the clip body, such that the detection window exposes at least part of an unobstructed region; and a positioning seal for channel sealing and capillary positioning is detachably connected at each of a sample inlet end and a sample outlet end of the detection window, and the capillary is capable of penetrating the positioning seal.

2. The capillary clip of claim 1, wherein an auxiliary mounting element is removably mounted in the detection window, the at least one optical detection element is detachably connected to the auxiliary mounting element, and the auxiliary mounting element is provided with a chamber for avoiding the capillary and guiding the at least one optical detection element to be positioned and be aligned with the capillary.

3. The capillary clip of claim 2, wherein the auxiliary mounting element has a plurality of chambers isolated from each other.

4. The capillary clip of claim 2, the chamber is configured to allow the at least one optical detection element to form an optical detection path perpendicular to the capillary.

5. The capillary clip of claim 1, wherein the detection window is rectangular, a ratio of the length to the width of the detection window is greater than 2, and the capillary passes through the detection window in a width direction of the detection window.

6. The capillary clip of claim 1, wherein the clip body comprises an inlet segment clip portion, a detection portion and an outlet combination portion that are connected in sequence.

7. The capillary clip of claim 6, further comprising a refrigerant channel defined by the clip body, the refrigerant channel and each of the capillary channels being combined at the inlet segment clip portion and the outlet combination portion, and the refrigerant channel and each of the capillary channels being separated at the detection window.

8. The capillary clip of claim 6, the inlet segment clip portion comprises at least one single-channel clip comprising a single-body clip and a connecting tube, wherein two ends of the connecting tube are connected to the single-body clip, and the connecting tube forms a part of the at least one capillary channel.

9. The capillary clip of claim 8, wherein the two ends of the connecting tube are detachably connected to the single-body clip such that the connecting tube with a different length is replaceable for the single-channel clip.

10. The capillary clip of claim 8, the inlet segment clip portion further comprises a detachable segment clip housing, the segment clip housing is mounted on a periphery of the at least one single-channel clip, and at least part of a tube body of the connecting tube is exposed from the segment clip housing.

11. The capillary clip of claim 6, wherein the detection body comprises an inlet window body and an outlet window body, the inlet window body and the outlet window body being detachably connected to each other, and the inlet window body and the outlet window body being assembled and combined to form the detection window.

12. The capillary clip of claim 6, wherein the clip body comprises at least two capillary channels, the outlet combination portion comprises a combining sealing body, and the at least two capillary channels converge in the combining sealing body to form a combined channel.

13. The capillary clip of claim 12, wherein the combined channel is provided with a bent portion, and the bent portion is capable of allowing the capillaries in the combined channel to adjust their exposed end lengths.

14. A capillary clip, comprising:

at least one capillary channel, a capillary being mounted in the capillary channel;

a clip body defining the at least one capillary channel;

a detection window provided on the clip body; and at least one optical detection element directly or indirectly connected in the detection window, wherein the at least one optical detection element is removable from the clip body, such that the detection window exposes at least part of an unobstructed region;

an auxiliary mounting element is removably mounted in the detection window, the at least one optical detection element is detachably connected to the auxiliary mounting element, and the auxiliary mounting element is provided with a chamber for avoiding the capillary and guiding the at least one optical detection element to be positioned and be aligned with the capillary; and the chamber is configured to allow the at least one optical detection element to form an optical detection path perpendicular to the capillary.

15. The capillary clip of claim 14, wherein the detection window is rectangular, a ratio of the length to the width of the detection window is greater than 2, and the capillary passes through the detection window in a width direction of the detection window.

16. The capillary clip of claim 14, wherein the clip body comprises an inlet segment clip portion, a detection portion and an outlet combination portion that are connected in sequence.

17. The capillary clip of claim 16, the inlet segment clip portion comprises at least one single-channel clip comprising a single-body clip and a connecting tube, wherein two ends of the connecting tube are connected to the single-body clip, and the connecting tube forms a part of the at least one capillary channel.

18. A capillary clip, comprising:

at least one capillary channel, a capillary being mounted in the capillary channel;

a clip body defining the at least one capillary channel;

a detection window provided on the clip body; and at least one optical detection element directly or indirectly connected in the detection window, wherein the at least one optical detection element is removable from the clip body, such that the detection window exposes at least part of an unobstructed region;

an auxiliary mounting element is removably mounted in the detection window, the at least one optical detection element is detachably connected to the auxiliary mounting element, and the auxiliary mounting element is provided with a chamber for avoiding the capillary and guiding the at least one optical detection element to be positioned and be aligned with the capillary; and the auxiliary mounting element has a plurality of chambers isolated from each other.

19. The capillary clip of claim 18, wherein the detection window is rectangular, a ratio of the length to the width of the detection window is greater than 2, and the capillary passes through the detection window in a width direction of the detection window.

20. The capillary clip of claim 18, wherein the clip body comprises an inlet segment clip portion, a detection portion and an outlet combination portion that are connected in sequence.

\* \* \* \* \*